Patented Oct. 29, 1929

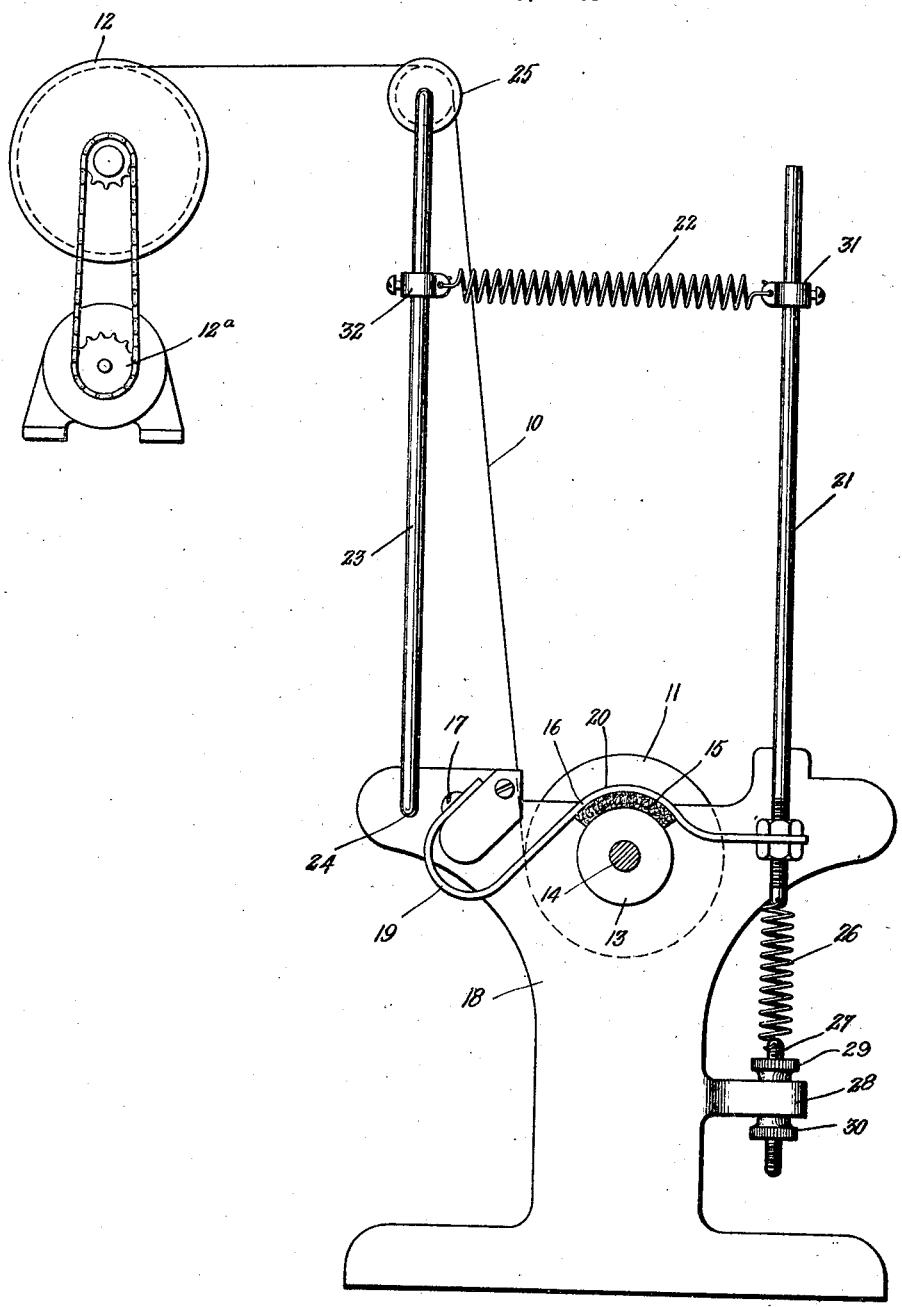

1,733,834

UNITED STATES PATENT OFFICE

RUSSELL STEELE, OF FORT WAYNE, INDIANA, ASSIGNOR TO GENERAL ELECTRIC COMPANY, A CORPORATION OF NEW YORK

TENSIONING DEVICE

Application filed November 20, 1926. Serial No. 149,751.

My invention relates to tensioning devices, more specifically to tensioning devices for coil winding machines, and has for its object the provision of a simple, reliable, and effective device of this character.

My invention has particular reference to tensioning devices employing a friction brake which may, for example, be regulated in accordance with the tension of the wire being wound. A great difficulty experienced in the operaton of such devices, particularly where wire of very small sizes is being wound, is the non-uniformity in the application of the brake, a small change in the tension of the wire causing the brake to be suddenly applied or released.

In carrying out my invention, I provide a flexible brake arm which bends during the application and release of the brake so as to cause the braking force to be changed gradually.

For a more complete understanding of my invention, reference should be had to the accompanying drawing in the single figure of which is shown a tensioning device embodying my invention.

Referring to the drawing, I have shown my invention in one form as applied to the winding of electrical magnet coils, although it obviously may be used in connection with various other materials, such as fabrics. The insulated electrical conductor 10 is drawn from a supply spool 11 and wound up into a magnet coil on the spool 12. Preferably, a driving force is applied to rotate the spool 12, for example, an electric motor $12^a$ may be connected to turn the spool 12 at the desired speed whereby the wire is drawn from the spool 11, which is allowed to rotate, and wound upon the spool 12.

For the purpose of maintaining the wire under a suitable tension, such that it will be wound into a firm, compact coil on the spool 12, a braking force is applied to the spool 11 whereby its rotation is retarded. As shown, a brake drum 13 is secured to the shaft 14 of the spool 11 so as to rotate with the spool, and cooperating with the periphery of this brake drum is a brake band 15 which may be made of a suitable flexible material such as leather, felt or asbestos. The brake band 15 is carried by a spring arm 16, forming a brake arm, which has one end rigidly secured at 17 to the supporting base 18 on which the spool 11 is mounted. The brake shoe 15 is held against the brake drum by the resiliency of the arm 16, and as shown, the arm is formed with a spring loop 19 adjacent its point of support. The brake arm is further shaped with an intermediate curved portion 20 in which the brake band 15 is secured. This portion 20 has a radius such that the brake band fits the circumference of the brake drum. In other words, the portion 20 forms part of a circle having for its center the axis of the shaft 14.

Secured rigidly to the end of the brake arm 16 at right angles to the brake arm and the axis of the shaft 14 is an arm 21. This arm is mechanically connected through a spring 22 to an arm 23 extending substantially parallel therewith and pivoted at a point 24 on the support 18. On the end of the arm 23 is an idler sheave 25 over which the wire passes in traveling from the spool 11 to spool 12. The arrangement of the spools and the arm 23 is such that a force is applied to the arm 23 by reason of the tension in the wire which force tends to move the arm about its pivot. In the operation of the mechanism an increase in tension in the wire 10 will swing the arm 23 toward the left about its pivot, and this movement is transmitted through the spring 22 in a somewhat modified degree to the arm 21, whereby the bending and lifting stress is exerted on the end of the brake arm 16. This stress, it will be observed, will tend to raise the brake shoe so as to decrease the braking friction, and at the same time will bend the brake arm so as to tend to open the curved portion 20, that is, increase its radius. This increase in curvature of the portion 20 has the effect of very gradually decreasing the braking friction. Conversely, when the tension in the wire 10 decreases, the arms 21 and 23 swing back toward the right to increase the braking friction.

As shown, a helical spring 26 is attached to the lower end of the arm 21 so as to apply a force in a direction to increase the brake pressure. For purposes of adjustment, the fixed end of the spring is secured to a rod 27 which extends through an aperture in a projection 28 on the support 18. Nuts 29 and 30 are provided on the rod on opposite sides of the projection, and by adjusting the nuts the rod can be adjusted to vary the tension of the spring 26 as desired.

The spring 22 serves to smooth out the movements of the arm 23 as applied to the arm 21. This action of the spring can be regulated by adjusting its position longitudinally with relation to the arms 21 and 23. As shown, the spring is secured to sliders 31 and 32 on the arms which may be secured by suitable clamping screws in any desired position on the arms. It will be observed, for example, that by moving the spring downward on the arms the damping action introduced by the spring will be increased. This prevents the application of sudden jerks in the wire to the brake.

I have found my invention to be particularly applicable to the winding of coils from extremely small wire having but little mechanical strength, such as coils for transformers used in radio apparatus. The mechanism permits of such delicate adjustment, and it is so sensitive in operation, that the coils may be wound at very high speeds without danger of breaking the wire. Furthermore, it will be observed that the device adjusts itself automatically to increases in the speed of the wire as the diameter of the spool 12 increases.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. A tensioning device for coil winding machines comprising in combination with a spool from which the material being wound is drawn, a brake drum for said spool, a flexible brake arm cooperating with said drum, said arm being provided with a curved portion substantially fitting on said drum, and means responsive to the tension of the material being wound for flexing said brake arm to vary the radius of said curved portion and thereby gradually change the braking force.

2. A tensioning device for coil winding machines comprising in combination with a spool from which the material being wound is drawn, a brake drum for said spool, a spring brake arm bearing on said drum and rigidly secured at one end, and means responsive to the tension of said material for applying a bending stress to the free end of said arm, so as to flex said arm and thereby gradually change the braking force.

3. A tensioning device for a coil winding machine provided with a brake drum driven by the material being wound, a flexible brake arm rigidly supported at one end, a flexible brake shoe carried by said arm, said arm being curved so that said brake shoe fits on a substantially large circumferential portion of said brake drum, and means responsive to the tension of the material for adjusting said brake arm to vary the braking force, said brake arm being arranged to flex to gradually vary the area of contact with said drum.

4. A tensioning device for coil winding machines comprising in combination with a spool from which the material being wound is drawn, a supporting base, a brake drum for said spool, a spring brake arm bearing on said drum and rigidly secured at one end, a rod rigidly secured to the movable end of said arm and extending substantially at right angles to said brake arm and the axis of rotation of said drum, a second rod pivoted adjacent said first rod and extending substantially parallel therewith, a spring connecting said rods, an idler sheave carried by said second rod over which said material passes, whereby said second rod is moved on its pivot in accordance with the tension of the material, and a tension spring connected at one end to said first-mentioned rod and adjustably secured to said base at the other end.

5. A tensioning device for coil winding machines comprising a supporting base, a brake drum rotatably mounted on said base and driven by the material being wound, a spring brake arm bearing on said drum and secured at one end to said base, a member secured at one end to the free end of said brake arm and extending at right angles to the axis of rotation of said drum, and means responsive to the tension of said material for moving the free end of said member laterally.

6. A tensioning device for coil winding machines comprising a supporting base, a brake drum rotatably mounted on said base and driven by the material being wound, a spring brake arm bearing on said drum secured at one end to said base, a rod secured to the free end of said brake arm, a second rod pivoted at one end to said base, an idler sheave carried by the other end of said second arm over which said material passes, a slider adjustably mounted on each of said rods, and a tension spring connecting said sliders.

7. A tensioning device for coil winding machines comprising a supporting base, a brake drum rotatably mounted on said base and driven by the material being wound, a spring brake arm bearing on said drum and rigidly secured at one end to said base, a rod rigidly secured to the free end of said brake arm, a second rod pivoted at one end to said base, an idler sheave carried by the other end of said second arm and over which said material passes, a slider adjustably mounted on each of said rods, a tension spring connecting said sliders, and a tension spring adjustably connected between one end of said first mentioned rod and said supporting base.

In witness whereof I have hereunto set my hand this 18th day of November, 1926.

RUSSELL STEELE.